(12) United States Patent
Campbell

(10) Patent No.: US 9,724,810 B2
(45) Date of Patent: Aug. 8, 2017

(54) COUPLING BOLT HOLE ALIGNMENT TOOL

(71) Applicant: Siemens Energy, Inc., Orlando, FL (US)

(72) Inventor: Ira J. Campbell, New Richmond, OH (US)

(73) Assignee: SIEMENS ENERGY, INC., Orlando, FL (US)

( * ) Notice: Subject to any disclaimer, the term of this patent is extended or adjusted under 35 U.S.C. 154(b) by 238 days.

(21) Appl. No.: 14/666,755

(22) Filed: Mar. 24, 2015

(65) Prior Publication Data
US 2016/0279771 A1   Sep. 29, 2016

(51) Int. Cl.
*F16B 33/00* (2006.01)
*B25B 27/16* (2006.01)
*F16B 19/02* (2006.01)

(52) U.S. Cl.
CPC .............. *B25B 27/16* (2013.01); *F16B 19/02* (2013.01)

(58) Field of Classification Search
CPC ....... B25B 27/16; B25B 27/023; F16B 19/02; F16D 1/033; F05D 2230/64; B23Q 3/186
See application file for complete search history.

(56) References Cited

U.S. PATENT DOCUMENTS 6,171,195 B1 * 1/2001 Ferguson ............... B25B 27/16
29/272

\* cited by examiner

*Primary Examiner* — Lee A Holly

(57) ABSTRACT

A coupling bolt hole alignment tool, a method to align two coupling holes, one in each of two coupling halves, and a system to align two coupling holes are provided. The coupling bolt hole alignment tool and system includes an expandable sleeve assembly configured to be inserted into the second coupling hole and secured into the second coupling hole with a wedge nut. A rotatable rod including an eccentric hole formed in one end of the rod is contained within the expandable sleeve assembly. A pin/paw assembly includes a pin and paw. The pin is inserted into the eccentric hole from the first coupling hole and the paw is disposed within the first coupling hole and includes a portion oriented against a wall of the first coupling hole. Rotation of the rotatable rod while the pin/paw assembly is held stationary by a restraining device aligns the two coupling holes.

11 Claims, 1 Drawing Sheet

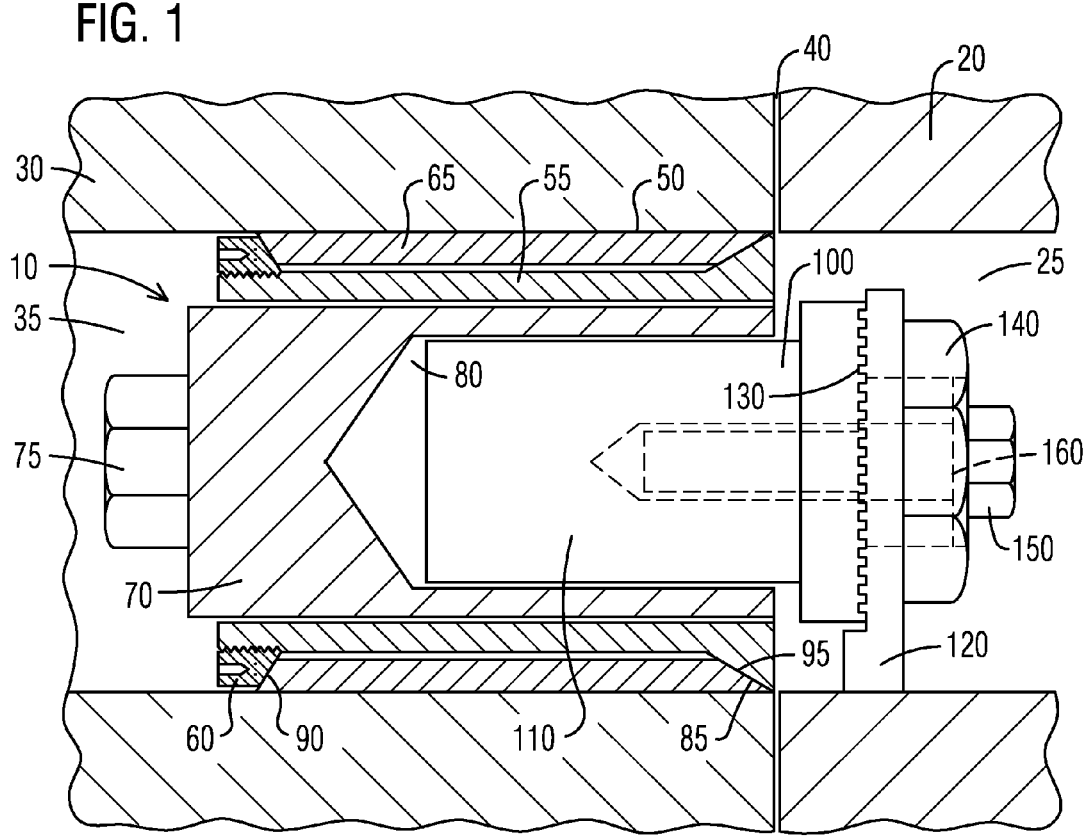
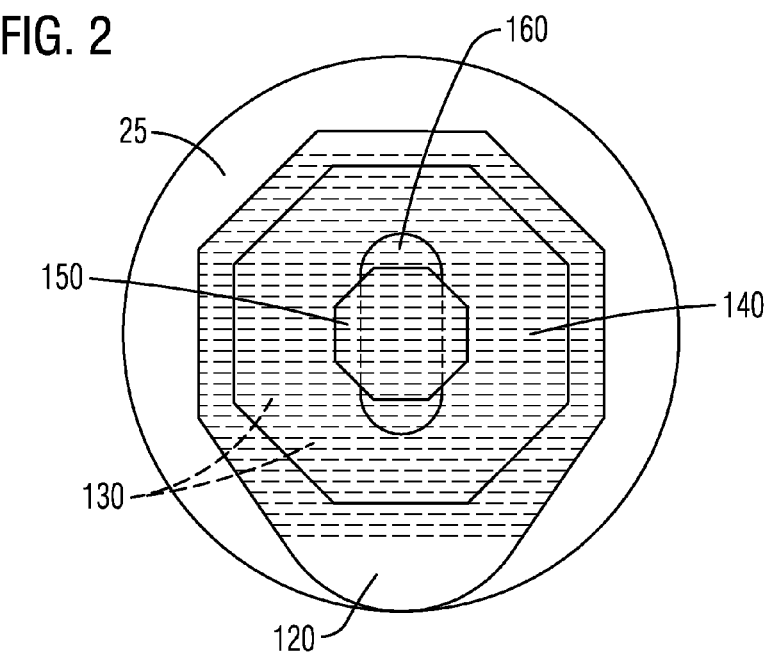

COUPLING BOLT HOLE ALIGNMENT TOOL

BACKGROUND

1. Field

The present application relates to large rotating turbomachinery, for example, steam and gas turbines and large electrical generators, and more particularly to a coupling hole alignment tool, system and method to align two corresponding coupling holes of two mating flanges on the rotating elements.

2. Description of the Related Art

Couplings, which may include shaft end flanges, must have bolt holes accurately aligned to install precisely fitted bolts. The bolts extend from a bolt hole in one coupling half into a bolt hole in another coupling half and then are secured, securing the coupling halves to one another. For example, a large turbine rotor is aligned to another large turbine rotor or to a generator rotor where each turbine rotor or generator rotor include a plurality of bolt holes to be aligned with corresponding bolt holes in the other turbine rotor or generator rotor. The weight of each rotor to be aligned may be as much as 200 tons. The rotors include a flange type coupling with approximately 12 to 30 bolt holes where each bolt hole may include a diameter between 1.5 inches to 3.5 inches. By design, these bolts, once installed, tightly fit within the bolt hole, for example having approximately 0.001 inch clearance on the diameter.

Most commonly, a hydraulic jack is used to turn one coupling half. A temporary pin sized to fit a coupling bolt hole is loaded in a bolt hole of the coupling half being rotated. The force delivered by the hydraulic jack is then imposed on the pin to effect rotation on the coupling half. Because of the tight clearance of the bolt in the bolt hole, precise alignment of the mating coupling flanges is quite difficult and time consuming using the hydraulic jack. A less difficult and/or less time consuming alignment of two shaft end flanges is desired.

SUMMARY

Briefly described, aspects of the present disclosure relate to a coupling bolt hole alignment tool, a method to align two coupling holes, one in each of two coupling halves, and a system to align two coupling holes.

A first aspect of provides a coupling bolt hole alignment tool that aligns two coupling halves, a first coupling hole in a first coupling half and a second coupling hole in a second coupling half. The coupling bolt hole alignment tool includes an expandable sleeve assembly inserted into the first coupling hole and secured into the first coupling hole with a wedge nut. The expandable sleeve assembly contains a rotatable rod including an eccentric hole formed in one end of the rotatable rod such that an opening of the eccentric hole is in a mating face of the second coupling half. The coupling bolt hole alignment tool also includes a pin/paw assembly including a pin and a paw. The pin is inserted into the eccentric hole from the first coupling hole. The paw is disposed within the first coupling hole and includes a portion oriented against a wall of the first coupling hole. A restraining device is coupled to the pin. Rotation of the rotatable rod while the pin/paw assembly is held stationary by the restraining device aligns the two coupling holes.

A second aspect provides a method to align two coupling holes, one in each of two coupling halves. The two coupling halves are aligned such that the two corresponding coupling holes are substantially concentric and a small gap exist between mating faces of the two coupling halves. Additionally, the method includes inserting an expansion sleeve assembly into a second coupling hole from a first non-mating face of a second coupling half, inserting a rotatable rod into the expansion sleeve assembly, inserting a pin/paw assembly into a first coupling hole from a second non-mating face of a second coupling half, rotating the rotatable rod, securing the pin/paw assembly by application of an opposing force to the torque of the rod. Rotation of the rod while the pin/paw assembly is held stationary aligns the two coupling holes.

A third aspect of provides a system to align two coupling holes, one in each of two coupling halves. The system includes a first coupling half including a first coupling hole and a second coupling half includes a second coupling hole. The system also includes an expandable sleeve assembly which is inserted into the first coupling hole and secured into the first coupling hole with a wedge nut. The expandable sleeve assembly contains a rotatable rod including an eccentric hole formed in one end of the rotatable rod such that an opening of the eccentric hole is in a mating face of the second coupling half. The system also includes a pin/paw assembly including a pin and a paw. The pin is inserted into the eccentric hole from the first coupling hole. The paw is disposed within the first coupling hole and includes a portion oriented against a wall of the first coupling hole. A restraining device is coupled to the pin. Rotation of the rotatable rod while the pin/paw assembly is held stationary by the restraining device aligns the two coupling holes.

BRIEF DESCRIPTION OF THE DRAWINGS

FIG. 1 illustrates a cross sectional view of a coupling hole alignment tool, and FIG. 2 illustrates a front view of the pin/paw assembly.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

A coupling bolt hole alignment tool, a method to align two coupling holes, one in each of two coupling halves, and a system to align two coupling holes are provided. The coupling bolt hole alignment tool is inserted and tightened in one coupling hole and extends into the mated second coupling hole. Once the coupling hole bolt alignment tool is installed, internally rotating it forces the mating holes into alignment so that the fitted bolts may be more easily installed. In order for the bolt holes to be accurately aligned and installed, turbomachinery has to be offline and in a partially disassembled condition, thus requiring an outage. The coupling bolt hole alignment tool, system and corresponding method to align two coupling holes may minimize critical outage time of the turbomachinery due to exactly matching the coupling holes for bolt installation. An estimate of the outage time savings may be as much as a half day. For example, a gain in revenues on a large nuclear outage may be in excess of one hundred thousand dollars and a cost reduction for maintenance overheads may be over twenty thousand dollars.

Additionally, the alignment tool may provide a more accurate alignment of the bolt holes which may minimize damage to the bolts and existing coupling flanges. Due to the adjustable nature of the tool which will be described in greater detail below, the tool design permits alignment when the two coupling halves do not have the same size bolt holes as frequently found during an upgrade outage when a new rotating element is being replaced. The tool is unique in this respect over other state of the art arrangements for aligning couplings with mismatched hole sizes.

FIG. 1 illustrates a cross sectional view of a coupling hole alignment tool (10) within two coupling holes (25, 35), a first coupling hole (25) and a second coupling hole (35), of two coupling halves (20, 30). The two coupling halves (20, 30) are shown side by side each including a coupling hole (25, 35) within the coupling half (20, 30). The first and second coupling holes (25, 35) lie next to one another such that the first and second coupling holes (25, 35) are essentially concentric with a small gap (40) between the coupling halves (20, 30). Each coupling half (20, 30) includes a mating face such that the gap (40) separates the mating faces of the coupling halves (20, 30). The mating faces may be flat faces or may include non-flat surfaces as the mating faces are separated by the gap (40) when the coupling hole alignment tool is used. A first coupling half (20) is therefore shown in FIG. 1 with a first coupling hole (25) and a second coupling half (30) is shown with a second coupling hole (35). The small gap (40), which may range from almost touching to approximately 0.25 inch, is disposed between the two coupling halves (20, 30).

As illustrated in FIG. 1, an expandable sleeve assembly (50) is shown within the second coupling hole (35). The expandable sleeve assembly (50) is configured to support a rotatable rod (70) and to be secured into the second coupling hole (35).

The expandable sleeve assembly may (50) comprise a cylindrical expandable collet sleeve (65) and a cylindrical sleeve bushing (55) which fits within the second coupling hole (35) such that an outer surface of the expandable sleeve collet (65) abuts the surface of the second coupling hole (35). The ends of the expandable collet sleeve (65) may be tapered. For example, the illustrated expandable collet sleeve (65) includes two tapered ends, a first tapered end (85) and a second tapered end (90). The expandable sleeve collet (65) ensures that the coupling hole alignment tool (10) may be securely tightened in any bolt hole of a coupling half even when there are slight variances in manufactured bolt hole diameters.

The expandable sleeve assembly (50) may comprise a cylindrical sleeve bushing (55) arranged concentrically with the expandable sleeve collet (65) and which is contained within and held by the expandable sleeve collet (65). The sleeve bushing (55) may also include a tapered end (95), which when inserted into the second coupling hole (35), the tapered end (95) begins at the mating face of the second coupling half (30). Additionally, when inserted the tapered end (95) of the sleeve bushing (55) mates with the opposing first tapered end (85) of the expandable sleeve collet (65). The opposing mated tapered ends (85, 95) of the sleeve bushing (55) and the expandable sleeve collet (65) cause the expandable collet sleeve (65) to expand exerting a force to hold the sleeve bushing (55) within the expandable collet sleeve (65).

The expandable sleeve assembly (50) is secured into the second coupling hole, for example by a wedge nut (60). On the end opposite the tapered end (95), the sleeve bushing (55) may include a threaded end. The wedge nut (60) may include a tapered end which abuts the second tapered end (90) of the expandable collet sleeve (65). The wedge nut (60) may also include threads which mate with the threaded end of the sleeve bushing (55). Once the threads of the wedge nut (60) are tightened onto the threaded end of the sleeve bushing (55), the expandable sleeve assembly (50) is secured and locked into the second coupling hole (35).

A rotatable rod (70) including an eccentric hole (80) formed in one end of the rotatable rod (70) may be contained within the expandable sleeve assembly (50) such that an opening of the eccentric hole (80) is in a mating face of the second coupling half (30). In the context herein, eccentric means having a centerline off the centerline of the second coupling hole (35). A minimal clearance exists between the rotatable rod (80) and the expandable collet sleeve (65) such that the clearance permits the rotatable rod (70) to rotate freely. As an example, a clearance of 0.005 in would be an appropriate clearance for the rotatable rod (70) to rotate freely. In this case, the centerline of the eccentric hole (80) is approximately 0.04 inch off the centerline of the second coupling hole (35). On a second end of the rotatable rod (70), a rod nut (75), or a hex extension to the rotatable rod (70) may be disposed in order to turn the rotatable rod (70) to obtain the desired coupling movement.

A pin/paw assembly (100) may be inserted through the first coupling hole (25) in the first coupling half (20). The pin/paw assembly (100) comprises a pin (110) and a paw (120). The pin (110) may include a first portion that fits within the eccentric hole (80) in the rotatable rod (70) such that the surface of the pin (110) abuts a surface of the rotatable rod (70). The first portion extends between the first coupling hole (25) and the second coupling hole (35) and across the small gap (40). Furthermore, the pin (110) may include a second portion including a face with a plurality adjustment increments (130). The paw (120) may include a face with a plurality of adjustment increments (130) that mate with the adjustment increments (130) of the face of the pin (110). The paw (120) also may include a portion that is oriented against the wall of the first coupling hole (25). Additionally, a portion (140) configured to accept a restraining device may be included in the pin/paw assembly (100). The pin (110), paw (120), and the portion (140) that accepts the restraining device may be held together by a fastener (150) that may include a screw and a nut.

FIG. 2 illustrates a front view of the pin/paw assembly (100) viewed from the non-mating face of the first coupling hole (25). The paw (120) is shown with the portion that is oriented against the wall of the first coupling hole (25). The paw (120) may also include flats as illustrated. The portion (140) that accepts the restraining device is shown including flats to accept the restraining device. Additionally, the fastener (150), illustrated as a screw, is shown within an elongated hole (160).

The paw (120) of the pin/paw assembly (100) may be configured to accommodate coupling holes having different diameters. For the pin/paw assembly to accommodate coupling holes having different diameters, the paw (120) may include a face with a plurality of adjustment increments (130) that mates with the adjustment increments (130) of the face of the pin (110). The plurality of adjustment increments (130) provides adjustability to the pin/paw assembly. For example, by adjusting the mating of the adjustment increments (130) of the pin (110) and the paw (120) relative to one another, the paw (120) may accommodate coupling holes of different diameters so that a portion of the paw (120) is oriented against the wall of the second coupling hole (35). As illustrated in FIG. 1, the plurality of adjustment increments (130) may include tongue and grooves. Each adjustment increment (130) may be approximately 0.06 inches, or in a range of 0.02-0.08 inch. When the adjustment increment is 0.06 inches, the effective adjustability between the eccentricity of the pin (110) on diameter and a gap, defined between the paw and the wall of the first coupling hole (25) provides a minimum adjustability of 0.020 inch.

In an embodiment, a restraining device may be coupled to the pin/paw assembly (100) to hold pin/paw assembly (100) stationary while the rotatable rod (70) rotates. The restraining device may be a wrench and the portion of the pin/paw assembly (100) configured to accept the restraining device may be an integral nut and/or a washer including flat portions. While the restraining device holds the pin/paw assembly (100) stationary, torque may be applied to the rotatable rod (70) so that it rotates within the expandable sleeve assembly (50). The torque may be applied to the rod nut (75) attached to the second end of the rotatable rod (70) by a wrench and/or other tool that may attach to the rotatable rod (70) in order for the rotatable rod (70) to rotate. The rotation of the rotatable rod (70) while the pin/paw assembly (100) is held stationary by the restraining device provides a force on the pin/paw assembly (100) such that the paw (120) pushes the first coupling hole (25) into alignment with the second coupling hole (35).

A plurality of coupling bolt hole alignment tools (10) may be used on a coupling flange, each attached to a set of corresponding mated bolt holes, to translate a rotor as opposed to rotating a coupling flange. For example, a second alignment tool or more may be used in concert to transmit motion from a purely rotational manner as opposed to only a tangential motion as may be experienced when only a single alignment tool is used. The expectation of high rotational friction and shaft flexibility may require a plurality of alignment tools to obtain precise hole alignment.

Referring to FIG. 1, a method to align two coupling holes, one in each of two coupling halves, is also provided. In an embodiment, two coupling halves (20, 30) are aligned such that the two corresponding coupling holes (25, 35) are substantially concentric and a small gap (40) exists between mating faces of the two coupling halves (20, 30).

An expansion sleeve assembly (50) may be inserted into a second coupling hole (35) from a non-mating face of a second coupling half (30) and a rotatable rod (70) may be inserted into the expansion sleeve assembly (50) such that the expansion sleeve assembly (50) is configured to support the rotatable rod (70) while permitting it to rotate. Into the first coupling half, a pin/paw assembly (100) may be inserted from a non-mating face of the first coupling half (20). Torque may be applied to the rotatable rod (80) while the pin/paw assembly (100) is secured by the application of an opposing force to the torque applied to the rotatable rod (70). The rotation of the rotatable rod (70) while the pin/paw assembly is held stationary aligns the two coupling holes.

As shown in FIG. 1 and mentioned previously, the expandable sleeve assembly (50) may comprise a cylindrical expandable collet sleeve (65) and a cylindrical sleeve bushing (55), secured by a wedge nut (60). The first tapered end (85) of the expandable collet sleeve (65) may mates with an opposing tapered end (95) of the expandable collet sleeve (65). In order to accommodate coupling holes of different diameters, the opposing tapered ends of the expandable collet sleeve (65) and the sleeve bushing (55) may be adjusted by sliding the mating faces of the opposing tapered ends relative to one another in opposite directions.

In the shown embodiment, the sleeve bushing (55) is secured to the expandable collet sleeve (65) and locked into the second coupling hole (35) using a wedge nut (60). The wedge nut (60) may include threads that mate with threads of the sleeve bushing (55). Additionally, the wedge nut (60) illustrated includes a tapered portion that mates with the second tapered end (90) of the expansion collet sleeve (65).

Once the pin/paw assembly (100) is inserted into the first coupling hole (25), a portion of the paw (120) may be positioned so that it abuts the wall of the first coupling hole (25) and a face of the paw (120) including a plurality of adjustment increments (130) is mated with an opposing face of the pin (110) also including a plurality of adjustment increments (130). By adjusting the mating of the plurality of adjustment increments, the pin/paw assembly (100) may accommodate the diameter of the first coupling hole (25). The plurality of adjustment increments (130) may be, for example, tongue and grooves. Each increment may be in a range of 0.02 to 0.08 inch.

The centerline of the eccentric hole (80) may be in a range of 0.04 to 0.06 inch off the centerline of the second coupling hole (35). Because of the eccentricity of the eccentric hole (80), rotation of the rotatable rod (70) provides a force on the pin/paw assembly (100) such that the paw (120) pushes the first coupling hole (25) into alignment with the second coupling hole (35).

Finally, before a bolt installation may occur, the coupling hole alignment tool (10) would be removed. In an embodiment, in order to remove the coupling hole alignment tool (10), the rotatable rod (70) and the expandable sleeve assembly (50) are removed from second coupling hole (35) and the pin/paw assembly (100) is removed from the first coupling hole (25). The rotatable rod (70) is removed from the expandable sleeve assembly (50) after which the wedge nut (60) may be loosened and removed from the expandable sleeve assembly (50). The expandable collet sleeve (65) and the sleeve bushing (55) may then be removed from the second coupling hole (35). In the first coupling hole (25), the fastener (150) is first unfastened, so that the pin/paw assembly (100) may be removed from the first coupling hole (25).

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A coupling bolt hole alignment tool that aligns two coupling holes in two coupling halves, a first coupling hole in a first coupling half and a second coupling hole in a second coupling half, the coupling hole bolt alignment tool, comprising:

an expandable sleeve assembly configured to be inserted into the second coupling hole and secured into the second coupling hole with a wedge nut;

a rotatable rod including an eccentric hole formed in one end of the rotatable rod wherein the rotatable rod is contained within the expandable sleeve assembly such that an opening of the eccentric hole is in a mating face of the second coupling half;

a pin/paw assembly including a pin and a paw wherein the pin is inserted into the eccentric hole from the first coupling hole and wherein the paw is disposed within the first coupling hole and includes a portion oriented against a wall of the first coupling hole;

a restraining device coupled to the pin, wherein rotation of the rotatable rod while the pin/paw assembly is held stationary by the restraining device aligns the two coupling holes.

2. The alignment tool as claimed in claim 1, wherein the expandable sleeve assembly comprises a cylindrical expandable sleeve collet and a cylindrical sleeve bushing, and wherein the sleeve bushing is configured to be held and secured within the second coupling hole by the expandable collet sleeve and the wedge nut.

3. The alignment tool as claimed in claim 2, wherein the sleeve bushing includes a tapered end which is configured to be inserted such that the tapered end begins at the mating face, wherein the tapered end mates with an opposing first tapered end of the expandable collet sleeve such that the opposing tapered ends cause the expandable sleeve assembly to expand, wherein a threaded end of the sleeve bushing, opposite the tapered end, includes threads which mate with the threads of the wedge nut, and wherein the wedge nut includes a tapered portion that abuts a second tapered end of the expandable sleeve collet.

4. The alignment tool as claimed in claim 1, wherein the paw is configured to accommodate coupling holes having different diameters, wherein the pin and paw each include a face having a plurality of adjustment increments which mate with each other, wherein the positioning of the adjustment increments of the paw mated against the plurality of adjustment increments of the pin allow the paw to accommodate coupling holes of different diameters or initial coupling hole offsets greater than the eccentric pin travel.

5. The alignment tool as claimed in claim 4, wherein the plurality of adjustment increments include tongue and grooves.

6. The alignment tool as claimed in claim 5, wherein each adjustment increment is in a range of 0.02 to 0.08 inches.

7. The alignment tool as claimed in claim 5, wherein a clearance exists between the rod and the expandable collet sleeve assembly to allow for the rotatable rod to freely rotate.

8. The alignment tool as claimed in claim 1, wherein the centerline of the eccentric hole is 0.02 to 0.06 inch off the centerline of the first coupling hole.

9. The alignment tool as claimed in claim 1, wherein the rotation of the rod provides a force on the pin/paw assembly such that the paw pushes the second coupling hole into alignment with the first coupling hole.

10. The alignment tool as claimed in claim 1, wherein a plurality of coupling hole alignment tools are used to translate a rotor.

11. A system to align two coupling holes, one in each of two coupling halves, comprising:

a first coupling half including a first coupling hole;

a second coupling half including a second coupling hole to be aligned with the first coupling hole;

an expandable sleeve assembly inserted into the first coupling hole and secured into the first coupling hole with a wedge nut;

a rotatable rod including an eccentric hole formed in one end of the rotatable rod wherein the rotatable rod is contained within the expandable sleeve assembly such that an opening of the eccentric hole is in a mating face of the first coupling half;

a pin/paw assembly including a pin and a paw wherein the pin is inserted into the eccentric hole from the second coupling hole and wherein the paw fits within the second coupling hole and includes a portion oriented against a wall of the second coupling hole; and a restraining device coupled to the pin, wherein rotation of the eccentric pin while the pin/paw assembly is held stationary by the restraining device aligns the two coupling holes.

* * * * *